(12) United States Patent
Thoreson

(10) Patent No.: US 11,931,221 B2
(45) Date of Patent: Mar. 19, 2024

(54) SELF-INFLATING TOOTH DAM

(71) Applicant: Mark Thoreson, Madras, OR (US)

(72) Inventor: Mark Thoreson, Madras, OR (US)

( * ) Notice: Subject to any disclaimer, the term of this patent is extended or adjusted under 35 U.S.C. 154(b) by 519 days.

(21) Appl. No.: 17/352,816

(22) Filed: Jun. 21, 2021

(65) Prior Publication Data

US 2022/0133437 A1    May 5, 2022

Related U.S. Application Data

(63) Continuation-in-part of application No. 17/086,387, filed on Oct. 31, 2020, now Pat. No. 11,596,498.

(51) Int. Cl.
*A61C 5/82* (2017.01)
*A61C 5/50* (2017.01)

(52) U.S. Cl.
CPC . *A61C 5/82* (2017.02); *A61C 5/50* (2017.02)

(58) Field of Classification Search
CPC .... A61C 5/80; A61C 5/82; A61C 5/85; A61C 5/88; A61C 5/50
USPC ................................................ 433/136, 138
See application file for complete search history.

(56) References Cited

U.S. PATENT DOCUMENTS

| | | | | |
|---|---|---|---|---|
| 4,261,697 A * | 4/1981 | Newitter | ................... | A61C 5/82 433/137 |
| 4,721,465 A * | 1/1988 | Barasz | ..................... | A61C 5/82 433/137 |
| 6,007,334 A * | 12/1999 | Suhonen | ................... | A61C 5/88 433/80 |
| 6,439,886 B1 * | 8/2002 | Thoreson | ................. | A61C 5/88 433/155 |
| 9,060,830 B2 * | 6/2015 | Warner | ..................... | A61C 5/82 |
| 9,888,981 B2 * | 2/2018 | Haws | ........................ | A61C 5/88 |
| 2017/0281310 A1 * | 10/2017 | Haws | ................... | A61C 1/0084 |
| 2022/0133436 A1 * | 5/2022 | Thoreson | ................. | A61C 5/82 433/136 |
| 2022/0133437 A1 * | 5/2022 | Thoreson | ................. | A61C 5/82 433/138 |
| 2024/0008963 A1 * | 1/2024 | Barg | ....................... | C08K 3/38 |

FOREIGN PATENT DOCUMENTS

| | | | | |
|---|---|---|---|---|
| CA | 2229403 A1 * | 8/1998 | | |
| DE | 2204933 A1 * | 8/1972 | | |
| EP | 860149 A1 * | 8/1998 | ............... | A61C 5/88 |

* cited by examiner

*Primary Examiner* — Matthew M Nelson
(74) *Attorney, Agent, or Firm* — Mark S Hubert

(57) ABSTRACT

A disposable, self-inflatable, matrix (tooth dam) used to form a temporary, removeable side wall for the placement of a tooth filling material. It has an array of three concavities (distal, central and proximal) formed in a polymer wrap that has a planar substrate sheet affixed across the front face of the wrap. The distal air chamber has a volume that equals or exceeds the combined volume of the central and proximal air chambers. Directly below the distal concavity on the inner face of the planar substrate is an adhesive region. When the distal air chamber is depressed, the air within inflates the other air chambers and it is retained in its compressed state by the adhesive region. The remaining air chambers press against one tooth and exert enough force to elastically secure the planar panel around the adjacent tooth. It prevents the tooth filling material from leaving the prepared tooth and entering the space between.

9 Claims, 4 Drawing Sheets

SELF-INFLATING TOOTH DAM

CROSS-REFERENCE TO RELATED APPLICATION

This application is a Continuation-in-Part of U.S. Utility patent application Ser. No. 17/086,387 filed Oct. 31, 2020, which is incorporated by reference herein in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to dentistry, and more particularly to tooth filling technology.

BACKGROUND

Tooth decay is a way of life for many people. Standard dental restorations involve the removal of decay from a tooth. After the decay has been removed and the resultant hole sterilized and dried, it is a relatively straight forward process to place restorative materials and contour to recreate normal tooth anatomy.

When the decay has penetrated the side of the tooth (marginal ridge) this side has to be partially removed. Here the job complexity goes up. With the side or marginal ridge penetrated, two things occur. First, there is no side boundary to retain the filling material and second, any filling material that does spill over between teeth, will cause complications down the road.

Currently, this situation is addressed by ensuring that there is adequate clearance between adjacent teeth by filing the space accordingly, and by placing a Toffelmire™ matrix steel band and clamp around all four sides of the tooth being repaired. These band clamps are uncomfortable and often require wedges to ensure the seal around the tooth is above the gum line, or to separate the teeth enough such that the band may be placed between them. Additionally, they can cause gum irritation. Other matrix and clamp devices are available but all use wedges for forcing the teeth apart.

Hence, an economical, disposable tooth isolating device (dam or matrix) would fulfill a long felt need in the restorative dental treatment industry. This new invention utilizes and combines known and new technologies in a unique and novel configuration to overcome the aforementioned problems and accomplish this.

BRIEF SUMMARY

In accordance with various embodiments, an inexpensive, single use self-inflatable dental matrix (tooth dam) is provided.

In one aspect, a self-inflatable matrix that is easy to install and can closely contour to the anatomy of posterior teeth is provided.

In another aspect, a self-inflatable matrix that can be installed quickly and securely without the need for additional expensive equipment.

In yet another aspect, a cutable, sterile self-inflatable matrix that can self-seal at any inflatable profile is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
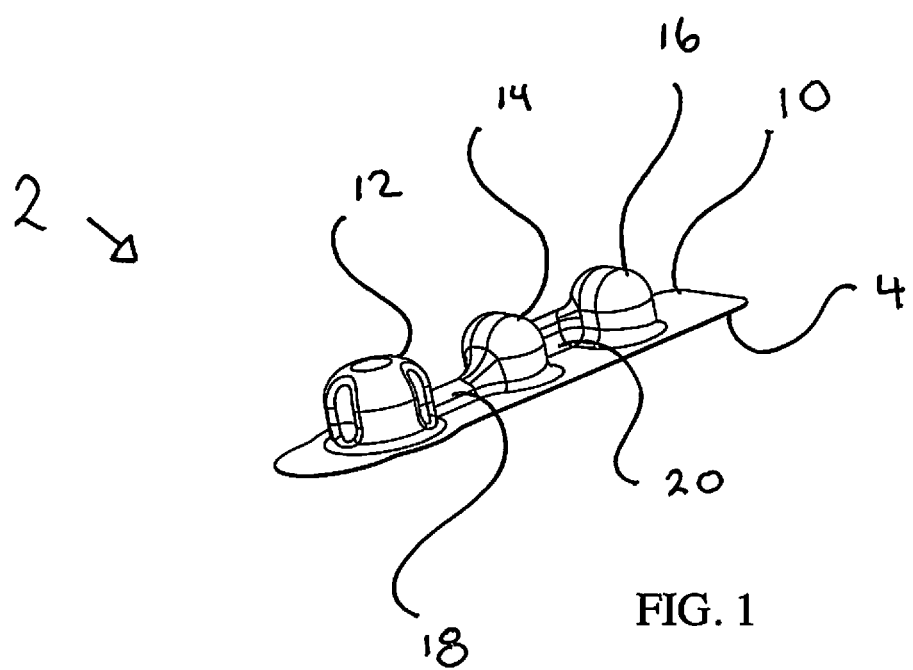
FIG. 1 is a perspective back view of a self-inflatable matrix.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the self-inflatable tooth dam. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first air chamber could be termed a second air chamber, and, similarly, a second air chamber could be termed a first air chamber, without departing from the scope of the inventive concept.

It will be understood that when an element or layer is referred to as being "on," "affixed to," or "connected to" another element or layer, it can be directly on, directly affixed to or directly connected to the other element or layer, or intervening elements or layers may be present. In contrast, when an element is referred to as being "directly on,"

"directly affixed to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the self-inflatable tooth dam embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "matrix" refers to a device that places a sheet barrier between adjacent teeth that is contoured around one tooth by exerting force from the adjacent tooth.

As used herein, the term "self-inflatable" refers to the ability of the matrix to adjustably inflate its interconnected, twin positioning chambers by the adjustable compression of its concave reservoir chamber onto its adhesive retention pad.

There have been several tooth dam devices utilized to seal the missing side wall of a tooth under reconstruction/filling. Most are expensive, uncomfortable and hard to install properly. The present device, in comparison, is shipped as a single piece, in a sterile wrapper and installed in seconds with an adjustable amount of flexion about a tooth, without any additional inflation equipment.

The present invention relates to a novel design for a disposable, self-inflatable, matrix used to form a temporary, removeable tooth side wall for the installation of a tooth filling material. It establishes the original anatomic configuration around much of the tooth, and maintains the correct spacing between adjacent teeth for flossing purposes and tooth movement. It serves to provide a rigid panel's contoured surface between the tooth being repaired and the adjacent tooth. This panel is adjustably curved to differing degrees, to mimic the side wall of the tooth under repair. It prevents the tooth filling material from adhering to the adjacent tooth and eliminating the interstitial space between the teeth necessary for flossing and proper dental hygiene. It also prevents the gum and cheek or lip from being pinched in one of the conventional matrix barrier bands.

Figure 2:
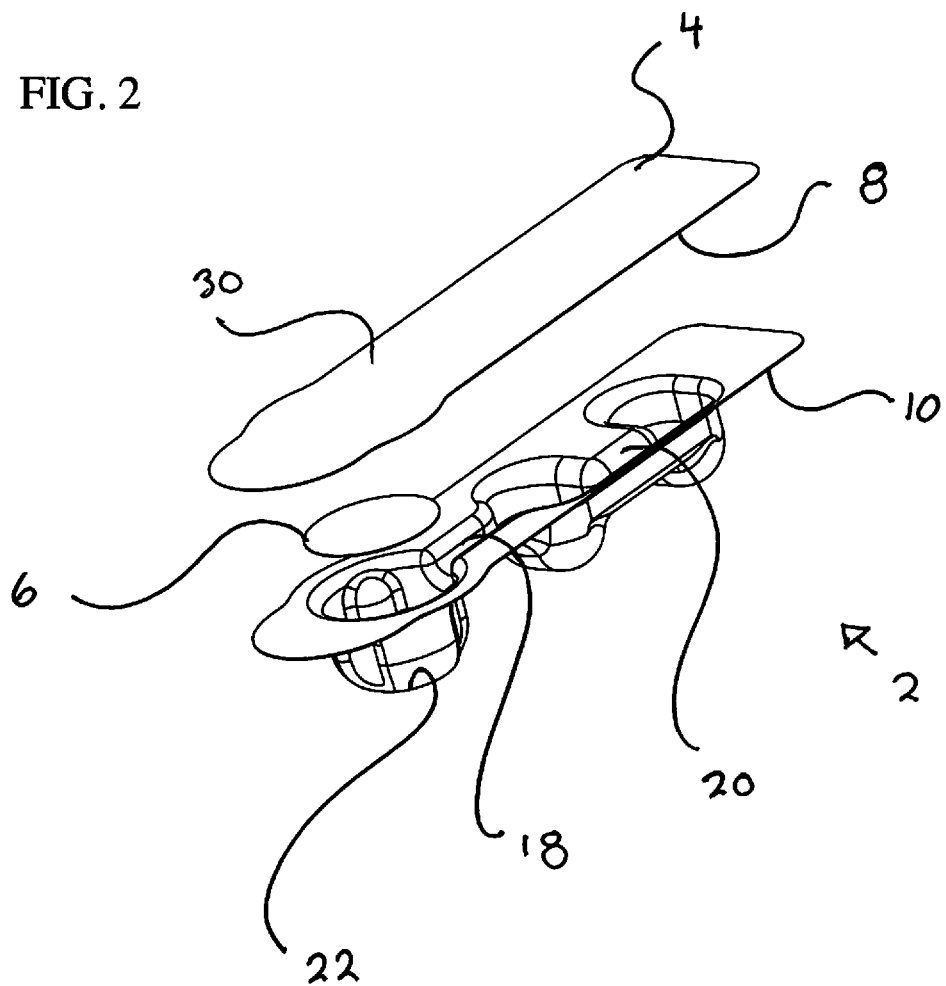
FIG. 2 is an exploded front view of the self-inflatable matrix.
Figure 3:
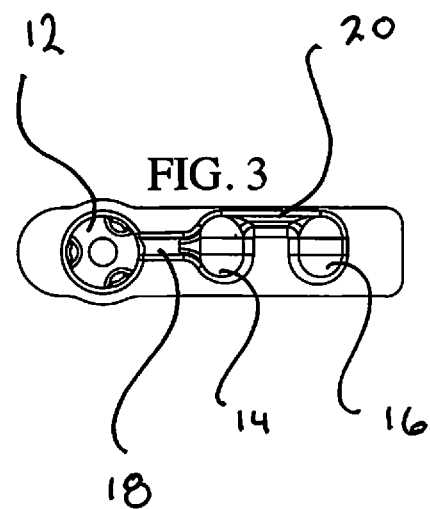
FIG. 3 is a top view of the self-inflatable matrix.
Figure 5:
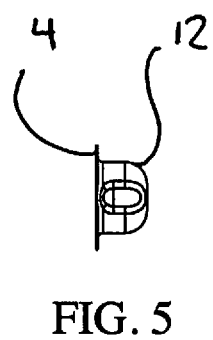
FIG. 5 is a left side view of the self-inflatable matrix.
Figure 4:
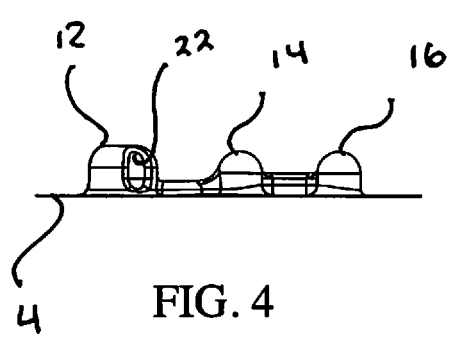
FIG. 4 is a side view of the self-inflatable matrix.
Figure 6:
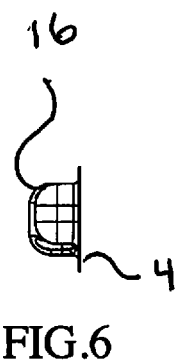
FIG. 6 is a right side view of the self-inflatable matrix.

Looking at FIGS. 1 and 2 it can be seen that the self-inflatable matrix 2 has but three elements, a planar, cutable, flexible substrate sheet 4, a polymer film 10 affixed to the inner face of the substrate sheet 4 having an array of three interconnected air chambers (concavities) 12, 14 and 16, and two offset, interconnecting air passages 18 and 20 formed thereon, and an adhesive pad 6 affixed to the inside face of the substrate sheet 4 under the largest volume, reservoir bubble 12.

FIGS. 3-6 show that the first and second air chambers 14 and 16, are approximately the same volume while the reservoir air chamber 12 is the largest of all three air chambers, and has a volume (with the remainder of the matrix 2 in its compressed state) that preferably equals or exceeds the combined volume of the first air chamber 14, the second air chamber 16, the first air passage 18 and the second air passage 20.

Between the reservoir air chamber 12 and the first air chamber 14 there is a first air channel 18 that connects them. Similarly, between the first air chamber 14 and the second air chamber 16 is a second interconnective air channel 20. These air channels 18 and 20 are not colinear and thus do not both lie along the linear axis of the matrix 2, but rather are offset with respect to each other. Directly below the reservoir air chamber 12, roughly centered below its inner face's concavity, on the inner face of the planar substrate is an adhesive region. In the preferred embodiment this adhesive region is a double sided adhesive tape or pad.

Figure 7:
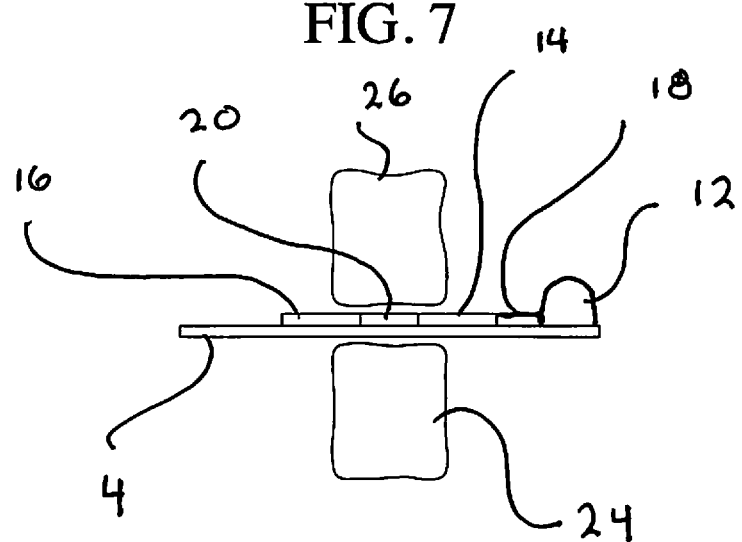
FIG. 7 is a top view of the self-inflatable matrix in its uninflated state positioned between adjacent teeth.
Figure 8:
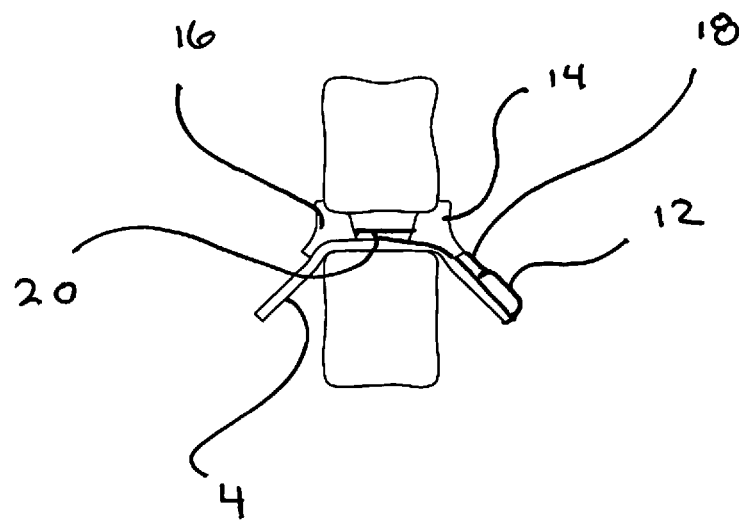
FIG. 8 is a top view of the self-inflatable matrix in its inflated state positioned between the same adjacent teeth of FIG. 7.

Looking at FIGS. 7 and 8 in unison, the operation of the matrix 2 can best be explained. When the matrix 2 is placed between adjacent first and second teeth 24 and 26 and the reservoir air chamber 12 is depressed, the air shifts and inflates the first and second air chambers 14 and 16 by passing through the first and second offset air passages 18 and 20. When any portion of the inside concave top face 22 of the reservoir air chamber 12 contacts the adhesive pad 6, they permanently adhere together, retaining the reservoir air chamber 12 in its compressed state and maintaining the level of inflation in the first and second air chambers 14 and 16. The first and second air chambers 14 and 16 contact and press against first tooth 26 and exert enough force to elastically secure the flexible, planar substrate panel 4 around the adjacent second tooth 24 without wedges and clamps. It prevents the tooth filling material from leaving the prepared second tooth 24 and entering the space between the teeth. This leaves the proper interstitial space between the first and second tooth 26 and 24 so as to enhance flossing and proper dental hygiene.

The degree of flexion that the substrate sheet undergoes to wrap around the body of the second tooth 24 is determined by the volume of air forced into the first and second air chambers 14 and 16. The greater the air pressure in these first and second air chambers 14 and 16, the more the first and second air chambers 14 and 16 push against the first tooth 26 and curve the substrate sheet 4. This is accomplished by the amount of force exerted onto the reservoir air chamber 12 and how much of the inside concave top face 22 is adhered to the adhesive region 6. The further the reservoir air chamber 12 is compressed and the more of its inside top face is stuck to the adhesive region 6, the greater the amount of flexion to contour the substrate sheet 4 around smaller teeth. This device will greatly enhance patient comfort, procedural efficiency and consistency of the interstitial spaces between adjacent teeth.

The adhesive region may be selected from the set of adhesive regions that include two sided adhesive disks, pads or tape, an applied liquid adhesive, contact cement applied to the substrate sheet and the concavity of the inside top face of the reservoir air chamber, hook and loop fasteners or the functional equivalents thereof.

The preferred embodiment matrix 2 is made of a cut-able flexible, planar substrate sheet or panel 4 of a first thickness that has polymer film 10 of a second, thinner thickness, affixed to the back face of the panel 4. The polymer film 10 is shaped into three concave air chambers interconnected by two air channels. In the specific geometric configuration used in the preferred embodiment matrix 2, the air channels 18 and 20 are located transverse to the linear arrangement of these air chambers, intersecting them perpendicularly, yet offset from each other 2. While this geometric arrangement has tested well, it is known that other geometric configurations of air chambers such as square, rectangular or round will also work. The height of the first and second air chambers 14 and 16 in the preferred embodiment is slightly larger than the height of an average human molar or pre-molar.

In the preferred embodiment, the planar panel 4 and the polymer film 10 are elastomeric thermoplastics or thermoset polymers with an elongation between 50 and 1000%, but preferably between 100 and 300%. The materials for the substrate sheet 4 may also include aluminum, a heat-resistant polymer resin plastic film, or a thin metal foil also bonded to a polymer material sheet. The sheet 4 and the film 10 also each have a durometer between 40 A to 100 A and a thickness in the range of 0.0005" and 0.005". The panel 4 has a preferred thickness of 0.05". The film 10 is thinner and once stretched or formed to incorporate the air chambers and air channels, is affixed to the thicker substrate panel 4 in the non-inflatable areas. This may be accomplished in a plethora of different polymer fabrication calendaring methods, as is well known in the industry. This may be by electron beam welding, heat welding, pressure sensitive adhesion, gluing, crimping and the equivalent techniques. The dam 2 will be sealed in an airtight sleeve (not illustrated) and irradiated to sterilize it prior to distribution to dentists.

The thickness of the sheet and panel combined is thin enough such that they can be cut or shaped for the specific situation with scissors, provided of course, that the inflatable regions of the air chambers 12, 14 and 16 and the air channels 18 and 20 are not compromised. The panel 4 has a preferred width of 0.591" and a preferred height of 0.39". The preferred height of the first and second air chambers 14 and 16 is 0.335". The first and second air chambers 14 and 16 center to center distance is 0.30". There may be an optional stiffener plate located between the matrix 2 between the first and second air chambers 14 and 16 to aid in inserting the matrix 2 between the two adjacent teeth 24 and 26, and the subsequent alignment.

The matrix is placed between the two teeth with its panel's front face 30 in contact with the tooth under repair 24. (FIGS. 7 and 8) The matrix 2 is slid downward until the bottom edge of its panel 4 is in contact at or slightly below the Cavo-surface gum line between the two teeth 26 and 26.

The second air channel 20 is just above the gumline of the teeth, so only the two air chambers 14 and 16 brace against the first tooth 26 to curve the planar substrate sheet 4. The reservoir air channel 12 is forcibly depressed so as to collapse, pushing its volume of air into the rest of the interconnected air chambers and air channels so as to inflate the remainder of the of the dam 2. (It is to be noted that all three of the air chambers 12, 14 and 16 are collapsible, and the volume of air within the tooth dam 2 is slightly more than what is required to completely fill the first and second air chambers 14 and 16 plus the first and second air channels 18 and 20. In this manner the first and second air chambers 14 and 16 may be collapsed during installation between teeth for fitment purposes, and inflated by collapsing the reservoir air chamber 12 therafter.) The lateral force exerted off of the adjacent tooth flexes and elastomerically deforms the panel 4 (FIG. 8) to wrap around the exterior surface of the second tooth under repair 24. This seals the side walls of tooth under repair 24 to accept filling material. The second inflated air channel 20 is placed just at the gumline between the two teeth so as to form a cavosurface gingival margin (space) slightly above the gumline so that the filling material does not flow into the gum. Hence, the purpose for the offset between the two air channels 18 and 20. The dentist may now proceed.

In alternate embodiments, (not illustrated) the adhesive region may be moved from below the reservoir air chamber 12 to one or both of the air channels 18 and 20. The material selection for the substrate panel 4 and the film 10 may vary widely and is dictated by their flexibility, ease of fabrication, taste, ability to be sterilized and cost.

Using this device, the setup time prior to a filling of a tooth with an eroded side wall is extremely reduced and the possibility of dental complications due to amalgam or other dental filling getting below the gumline is also greatly minimized.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A self-inflatable tooth dam, comprising:
    a planar, flexible substrate panel having a front face and a back face;
    a polymer film affixed to said back face;
    an array of three interconnected, airtight, collapsible air chambers formed between said panel and said polymer film; and
    an adhesive region affixed to said back face of said substrate panel beneath one of said three interconnected air chambers.

2. The self-inflatable tooth dam of claim 1 wherein said array of three interconnected air chambers comprises a reservoir air chamber, a first air chamber and substantially similar second air chamber.

3. The self-inflatable tooth dam of claim 2 wherein said adhesive region is affixed to said back face of said substrate panel beneath said reservoir air chamber.

4. The self-inflatable tooth dam of claim 3 further comprising:

a first air channel located between said reservoir air chamber and said first air chamber for the passage of air from said reservoir air chamber;

a second air channel located between said first air chamber and said second air chamber for the passage of air from said reservoir air chamber; and wherein said first air channel and said second air channel are not colinear.

5. The self-inflatable tooth dam of claim 4 further comprising:

a first volume contained within said reservoir air chamber, a second volume contained including the summation of the volume of air in said first air chamber, said second air chamber, said first air channel and said second air channel; and wherein said first volume equals or exceeds said second volume.

6. The self-inflatable tooth dam of claim 1 wherein only said reservoir air chamber is collapsible or said first and second air chambers are collapsible at the same time.

7. A self-inflatable tooth dam, comprising:

a planar, flexible substrate panel having a front face and a back face;

a polymer film affixed to said back face;

a reservoir, first and second air chamber formed between said panel and said polymer film;

a first air channel connecting said reservoir air channel and said first air chamber;

a second air channel connecting said first air channel and said second air channel;

an adhesive region affixed to said back face of said substrate panel beneath at least one of said first air channel or said second air channel.

8. The self-inflatable tooth dam of claim 7 further comprising:

a first volume contained within said reservoir air chamber, a second volume contained including the summation of the volume of air in said first air chamber, said second air chamber, said first air channel and said second air channel; and wherein said first volume equals or exceeds said second volume.

9. The self-inflatable tooth dam of claim 7 wherein only said reservoir air chamber is collapsible or said first and second air chambers are collapsible at the same time.

* * * * *